US012771718B2

(12) United States Patent
Rönnblom et al.

(10) Patent No.: US 12,771,718 B2
(45) Date of Patent: Oct. 20, 2026

(54) CPU AND METHOD ASSOCIATED WITH A SECURITY ASSOCIATION

(71) Applicant: Telefonaktiebolaget LM Ericsson (publ), Stockholm (SE)

(72) Inventors: Mattias Rönnblom, Vikingstad (SE); Onar Olsen, Skogås (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 6 days.

(21) Appl. No.: 18/849,466

(22) PCT Filed: Apr. 25, 2022

(86) PCT No.: PCT/EP2022/060876
§ 371 (c)(1),
(2) Date: Sep. 20, 2024

(87) PCT Pub. No.: WO2023/208313
PCT Pub. Date: Nov. 2, 2023

(65) Prior Publication Data
US 2025/0337776 A1 Oct. 30, 2025

(51) Int. Cl.
*H04L 9/00* (2022.01)
*H04L 9/40* (2022.01)

(52) U.S. Cl.
CPC ...... *H04L 63/1466* (2013.01); *H04L 63/1433* (2013.01); *H04L 63/166* (2013.01)

(58) Field of Classification Search
CPC ........................ H04L 63/1466; H04L 63/1433
(Continued)

(56) References Cited

U.S. PATENT DOCUMENTS 10,187,316 B2 * 1/2019 Liljedahl ................. H04L 47/32
2009/0158417 A1 * 6/2009 Khanna ............... H04L 63/1466 726/22

(Continued)

FOREIGN PATENT DOCUMENTS

CN 104038505 A 9/2014

OTHER PUBLICATIONS

International Search Report and Written Opinion, App. No. PCT/EP2022/060876, Dec. 14, 2022, 13 pages.

(Continued)

*Primary Examiner* — Christopher J Brown
(74) *Attorney, Agent, or Firm* — Nicholson De Vos Webster & Elliott LLP

(57) ABSTRACT

A CPU comprising multiple cores, a method, a computer program and a computer program product associated with a Security Association (SA) is disclosed. The CPU divides an anti-replay window for the SA into at least two sub anti-replay windows wherein each of the sub anti-replay windows is assigned a sub anti-replay window identifier, and receives a first packet and a second packet, each comprising an integrity protected part. For each of the first packet and the second packet, the CPU determines a sub anti-replay window among the sub anti-replay windows and produces a derived sub anti-replay window identifier. The CPU performs a lookup for the sub anti-replay window using the derived sub anti-replay window identifier for each of the first packet and the second packet against the sub anti-replay window identifier of each of the sub anti-replay windows. The CPU then performs a service.

18 Claims, 8 Drawing Sheets

(58) Field of Classification Search
USPC .............................................................. 726/22
See application file for complete search history.

(56) References Cited

U.S. PATENT DOCUMENTS

| | | | | |
|---|---|---|---|---|
| 2012/0042096 | A1* | 2/2012 | Wu | H04L 63/1466 709/238 |
| 2015/0188823 | A1* | 7/2015 | Williams | H04L 12/4633 370/235 |
| 2016/0277358 | A1* | 9/2016 | Ambati | H04L 63/1466 |
| 2019/0297533 | A1* | 9/2019 | Liedes | H04L 1/1642 |
| 2021/0006545 | A1* | 1/2021 | Kariyanahalli | H04L 63/0236 |
| 2023/0198912 | A1* | 6/2023 | Mcdonnell | H04L 47/2441 370/230 |

OTHER PUBLICATIONS

S. Kent, “IP Encapsulating Security Payload (ESP),” Dec. 2005, 44 pages, RFC 4303, The Internet Society.
L. Avramov et al., “Data Center Benchmarking Terminology,” Aug. 2017, 20 pages, RFC 8238.

* cited by examiner

| Packet arrival order | | #1 | #2 | #3 | #4 | #5 |
|---|---|---|---|---|---|---|
| ESP Sequence Number | | 2 | 4 | 3 | 3 | 0 |
| Payload-based sub anti-replay window ID | NA | 0 | 0 | 1 | 1 | 0 |
| Sub anti-replay window ID: 0 | W: 0-3 | W: 0-3; M: 2 | W: 1-4; M: 2,4 | W: 1-4; M: 2,4 | W: 1-4; M: 2,4 | W: 1-4; M: 2,4 |
| Sub anti-replay window ID: 1 | W: 0-3 | W: 0-3 | W: 0-3 | W: 0-3; M: 3 | W: 0-3; M: 3 | W: 0-3; M: 3 |
| Verdict | NA | Accept | Accept | Accept | Drop | Drop |

FIGURE 6

CPU AND METHOD ASSOCIATED WITH A SECURITY ASSOCIATION

CROSS-REFERENCE TO RELATED APPLICATIONS

This application is a National stage of International Application No. PCT/EP2022/060876, filed Apr. 25, 2022, which is hereby incorporated by reference.

TECHNICAL FIELD

The invention relates to a method associated with a security association and performed by a Central Processing Unit (CPU), a CPU, a computer program, and a corresponding computer program product.

BACKGROUND

Anti-replay is a feature widely implemented in some protocols in communication networks and in numerous consumer electronics. In communication networks, anti-replay is used in Security Associations (SAs) such as Internet Protocol Security (IPsec) SA, Media Access Control Security (MACsec) SA, and Datagram Transport Layer Security (DTLS) SA. IPsec is a secure network protocol suite that authenticates and encrypts the packets of data to provide secure encrypted communication between two computers over an Internet Protocol (IP) network, wherein the IP network may be trusted or untrusted. IPsec is also used in virtual private networks (VPNs). IPsec with integrity and confidentiality protection is mandatory for all user plane and control plane traffic in 3rd Generation Partnership Project (3GPP) 4G and 5G mobile networks unless the network can be trusted.

The current state of the art technology is to implement the IP protocol stack in software (SW) on Common Off-The-Shelf (COTS) hardware. The hardware (HW) is often a System on a Chip (SoC) comprising a multi-core CPU with one or more HW accelerators for packet processing.

Encryption and integrity functionality required for IPsec are usually offloaded to the HW accelerators if the throughput requirement is high. For cloud native IPsec implementations, CPU cores are used for encryption and integrity operations. Some IPsec HW accelerators are "self-contained" meaning that the complete IPsec protocol processing is implemented in the HW accelerator. Other HW accelerators only implement support for encryption/decryption and integrity check functions. For the latter case, the IPsec protocol processing is implemented in SW.

Anti-replay is a feature of IPsec wherein a receiver maintains a 'sliding window' record of the sequence numbers of validated received packets. The receiver rejects all packets which have a sequence number (SN) lower than sliding window start, that is, too old or all packets which have already appeared within the sliding window, that is, duplicate packets or replayed packets. Anti-replay can be used with both an Encapsulating Security Payload (ESP) protocol and an Authentication Header (AH) protocol of IPsec. Thus, anti-replay can also be used with both encapsulation modes provided by IPsec, that is, tunnel mode and transport mode.

Parts of an IP protocol stack are typically implemented in user space, that is, not in an operating system's networking stack for performance reasons. This part of the IP protocol stack is known as a "fast path". Programming frameworks such as Data Plane Development Kit (DPDK) are commonly used for fast path development. Fast path programming frameworks may support an event driven programming model which can be used to build packet processing pipelines with several stages. A stage in these packet processing pipelines can be atomic, ordered, or parallel. Atomic scheduling on a queue ensures that a single traffic flow is not present on two different CPU cores at the same time. Ordered scheduling allows sending all flows to any of the CPU cores, but in this case the scheduler must ensure that on egress the packets are returned to ingress order on downstream queue enqueue. Parallel scheduling allows sending all traffic flows to all CPU cores, without any packet ordering guarantees during reception at a receiver.

US 2016277358 A1 discloses an approach to detect replay attacks while having multiple cores in a multi-core processor manage an established tunneling session. The tunneling session includes a number of flows. One of the cores is assigned to manage one of the flows, and another core is assigned to manage another of the flows.

The existing solutions and techniques to scale up the anti-replay service in a multi-core SoC have several disadvantages. In many communication networks, a single IPsec SA may carry a significant amount of traffic. A common configuration in current 4G and 5G networks is to tunnel all user plane traffic to a base station in one SA. It is possible to use multiple SAs, but most network operators prefer to use as few SAs as possible to keep the cost of IPsec configuration, maintenance, and leasing of IPsec connections down. The anti-replay service, which is executed per inbound IPsec SA, is specified in a serial manner. This means that it is difficult to implement the anti-replay service in a scalable way. Also, the current implementation of anti-replay with only a single anti-replay window leads to an increased load and store contention which eventually results in stalling of the CPU during processing of incoming packets or traffic flows. Often a dedicated atomic processing stage is used for anti-replay. A dedicated atomic processing stage limits the single IPsec SA throughput to the capacity of a single CPU core. Alternative solutions like Smart Network Interface Controllers (NICs) are expensive and thus, increase both manufacturing and SW cost. A Smart NIC solution will also make the SW less portable. Separate SW tracks are needed for low end deployments (deployments without smart NICs) and high-end deployments (deployments with smart-NICs). Some of the existing solutions cannot be used on packets comprising encrypted data. Also, some solutions incorporate an additional protocol such as Internet Key Exchange (IKE) for performing negotiation between the sender system and receiver system which leads to an increase in overhead and reduction in system efficiency. Also, lockless anti-replay service exists, but it uses computation intensive atomic compare-and-swap (CAS) instructions which often lead to high contention for cache lines that hold the anti-replay window state. Furthermore, synchronization becomes a processing intensive task once high-frequency inter-CPU core synchronization is considered.

SUMMARY

An object of the invention is to improve security involving a multi-core CPU.

This and other objects are met by means of different aspects of the invention, as defined by the independent claims.

According to a first aspect, a method associated with a Security Association, SA, performed by a Central Processing Unit, CPU, comprising multiple cores is provided. The method comprises dividing an anti-replay window for the SA into at least two sub anti-replay windows wherein each of the sub anti-replay windows is assigned a sub anti-replay window identifier. The method comprises receiving a first packet and a second packet, each of the first packet and the second packet comprising an integrity protected part. The method comprises for each of the first packet and the second packet, determining a sub anti-replay window among the sub anti-replay windows based on a hash computation which uses data from the integrity protected part of the first packet and the second packet as sole input to produce a derived sub anti-replay window identifier for each of the first packet and the second packet. The method comprises performing a lookup for the sub anti-replay window using the derived sub anti-replay window identifier for each of the first packet and the second packet against the sub anti-replay window identifier of each of the sub anti-replay windows. The method comprises performing a service, wherein the service uses the derived sub anti-replay window identifiers for each of the first packet and the second packet to accept the first packet and reject the second packet if sequence number of the first packet and second packet are the same, and accept the first packet and the second packet if sequence number of the first packet and the second packet are different.

Hereby is achieved that, the need for compute-intensive tasks such as high-frequency inter-CPU core synchronization is reduced. Another notable advantage is that the invention allows for better performance, increased efficiency and improved scalability since more CPU cores may participate in the processing of packets pertaining to a given IPsec SA. Furthermore, each sub anti-replay window is based on the computed hash value, which in turn is based completely/exclusively on the data obtained from the particular packet, thus the sub anti-replay window is effectively immutable to a potential attacker. Thus, protection against anti-replay attacks is ensured or at least improved. One of the several achievements is that multiple sub anti-replay windows will reduce load and store contention which results in a reduction in CPU stalls.

According to an embodiment, the service is an anti-replay service.

According to an embodiment, the method comprises receiving the first packet and the second packet, one each at two of the multiple cores.

According to an embodiment, the method comprises receiving the first packet and the second packet at one of the multiple cores.

According to an embodiment, the number of sub anti-replay windows is less than or equal to 2^[length of data (in bits)].

According to an embodiment, the method comprises distributing the first packet and the second packet to the same sub anti-replay window if the sequence number of the first packet and the sequence number of the second packet are equal.

According to an embodiment, the method comprises receiving a third packet and distributing the third packet to the same sub anti-replay window as the first packet if sequence number of the third packet is same as the sequence number of the first packet.

According to an embodiment, the method comprises receiving a third packet and distributing the third packet to the same sub anti-replay window as the second packet if sequence number of the third packet is same as the sequence number of the second packet.

According to an embodiment, the method comprises distributing the first packet and the second packet to different sub anti-replay windows if the sequence number of the first packet and the second packet are different.

According to an embodiment, the method comprises receiving a third packet and distributing the third packet to the same sub anti-replay window as the first packet if the sequence number of the third packet is identical same as the sequence number of to the first packet.

According to an embodiment, the method comprises receiving a third packet and distributing the third packet to the same sub anti-replay window as the second packet if sequence number of the third packet is same as the sequence number of the second packet.

According to an embodiment, the method comprises distributing the first packet and the second packet to different sub anti-replay windows if the sequence number of the first packet and the second packet are different.

According to an embodiment, performing of the service on the first packet and the second packet is done using other bytes in the first packet and the second packet than the respective Security Parameters Index, SPI, value.

According to an embodiment, the first packet and the second packet belong to a first traffic flow and a second traffic flow.

According to an embodiment, the method comprises scheduling the first traffic flow and the second traffic flow one each at two of the multiple cores using atomic scheduling. Hereby is achieved that, the need for cross-core CPU synchronization is reduced.

According to an embodiment, if the data selected for traffic flow identification is the same as the data selected for determining the sub anti-replay window, no synchronization is required when updating the sub anti-replay window.

According to an embodiment, the method comprises scheduling the first traffic flow and the second traffic flow one each at two of the multiple cores using ordered scheduling.

According to an embodiment, the method comprises determining contention risk in the service based on the number of sub anti-replay windows.

According to an embodiment, the sub anti-replay window comprises a right edge and a left edge.

According to an embodiment, the method comprises periodically syncing the right edge and left edge. Hereby is achieved that an old packet that has a SN lower than the left edge is prevented from being accepted.

According to an embodiment, the method comprises processing the sub anti-replay windows on a per core basis.

According to an embodiment, the method comprises performing the service on the first packet and the second packet in parallel.

According to an embodiment of the method, the hash computation for each of the first and the second packet always results in the same derived sub anti-replay window identifier for each of the first packet and the second packet.

According to an embodiment, the method comprises performing the hash computation in a Network Interface Card, NIC.

According to an embodiment of the method, the integrity protected part of the first packet and the second packet are the Encapsulation Security Payload, ESP, header, payload data and ESP trailer in each of the first packet and the second packet.

According to an embodiment of the method, the data from the integrity protected part of each of the first packet and the second packet is encrypted.

According to an embodiment, the hash computation for each of the first packet and the second packet comprises extracting an encrypted bit of each of the first packet and the second packet.

According to an embodiment, the data from the integrity protected part of each the first packet and the second packet is unencrypted.

According to an embodiment, the SA is an Internet Protocol Security, IPSec, SA.

According to an embodiment, the SA is a Media Access Control Protocol Security, MACSec, SA.

According to an embodiment, the SA is a Datagram Transport Layer Security, DTLS, SA.

According to a second aspect, a CPU comprising multiple cores is provided. The CPU is configured to divide an anti-replay window for the SA into at least two sub anti-replay windows wherein each of the sub anti-replay windows is assigned a sub anti-replay window identifier. The CPU is configured to receive a first packet and a second packet each of the first packet and the second packet comprising an integrity protected part. The CPU is configured to determine for each of the first packet and the second packet a sub anti-replay window among the sub anti-replay windows based on a hash computation which uses data from the integrity protected part of the first packet and the second packet as sole input to produce a derived sub anti-replay window identifier for each of the first packet and the second packet. The CPU is further configured to perform a lookup for the sub anti-replay window using the derived sub anti-replay window identifier for each of the first packet and the second packet against the sub anti-replay window identifier of each of the sub anti-replay windows. The CPU is configured to perform a service, wherein the service uses the derived sub anti-replay window identifiers for each of the first packet and the second packet to accept the first packet and reject the second packet if sequence number of the second packet and the first packet are the same and accept the first packet and the second packet if sequence number of the first packet and the second packet are different.

According to an embodiment, the service is an anti-replay service.

According to an embodiment, the CPU is configured to receive the first packet and the second packet, one each at two of the multiple cores.

According to an embodiment, the CPU is configured to receive the first packet and the second packet at one of the multiple cores.

According to an embodiment, the number of sub anti-replay windows is less than or equal to 2^[length of data (in bits)].

According to an embodiment, the CPU is configured to distribute the first packet and the second packet to the same sub anti-replay window if the sequence number of the first packet and the sequence number of the second packet are same.

According to an embodiment, the CPU is configured to receive a third packet and distributing the third packet to the same sub anti-replay window as the first packet if sequence number of the third packet is same as the sequence number of the first packet.

According to an embodiment, the CPU is configured to receive a third packet and distributing the third packet to the same sub anti-replay window as the second packet if sequence number of the third packet is same as the sequence number of the second packet.

According to an embodiment, the CPU is configured to distribute the first packet and the second packet to different sub anti-replay windows if the sequence number of the first packet and the second packet are different.

According to an embodiment, the service on the first packet and the second packet is performed using other bytes in the first packet and the second packet than the respective SPI value.

According to an embodiment, the first packet and the second packet belong to a first traffic flow and a second traffic flow.

According to an embodiment, the CPU is configured to schedule the first traffic flow and the second traffic flow one each at two of the multiple cores using atomic scheduling.

According to an embodiment, if the data selected for traffic flow identification is the same as the data selected for determining the sub anti-replay window, no synchronization is required when updating the sub anti-replay window. Hereby is achieved that no "extra" processing stage needs to be added, and that inter-core anti-replay window synchronization would no longer be needed.

According to an embodiment, the CPU is configured to schedule the first traffic flow and the second traffic flow one each at two of the multiple cores using ordered scheduling.

According to an embodiment, the CPU is configured to determine contention risk in the service based on the number of sub anti-replay windows.

According to an embodiment, the sub anti-replay window comprises a right edge and a left edge.

According to an embodiment, the CPU is configured to periodically sync the right edge and left edge.

According to an embodiment, the CPU is configured to process the sub anti-replay windows on a per core basis.

According to an embodiment, the CPU is configured to perform the service on the first packet and the second packet in parallel.

According to an embodiment, the hash computation for each of the first and the second packet always results in the same derived sub anti-replay window identifier for each of the first packet and the second packet.

According to an embodiment, the CPU is configured to delegate the hash computation to a NIC.

According to an embodiment, the integrity protected part of the first packet and the second packet are the ESP header, payload data and ESP trailer in each of the first packet and the second packet.

According to an embodiment, the data from the integrity protected part of each of the first packet and the second packet is encrypted.

According to an embodiment, the hash computation for each of the first packet and the second packet comprises extracting an encrypted bit of each of the first packet and the second packet.

According to an embodiment, the data from the integrity protected part of each the first packet and the second packet is unencrypted.

According to an embodiment, the SA is an IPSec SA.

According to an embodiment, the SA is a MACSec SA.

According to an embodiment, the SA is a DTLS SA.

A third aspect relates to a computer program, which comprises instructions which, when executed on a processing circuitry, cause the processing circuitry to carry out the method according to any one of the embodiments of the first aspect.

According to a fourth aspect, a computer program product is provided. The computer program product comprises a non-transitory computer readable storage medium and a computer program according to the third aspect stored thereon.

The CPU, the method, the computer program and the computer program product can be used in various applications such as communications network node such as radio base station, routers, gateways, switches, etc. Other applications of the CPU, the method, the computer program and the computer program product are in computing systems such as data centers on the edge, edge computers, micro data centers.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which:

FIG. 6 illustrates a tabular format of an example for anti-replay service on an IPsec SA with an ESP header, in accordance with an embodiment of the invention.

Figure 1A:
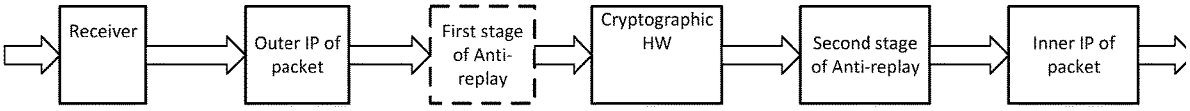
(Prior Art) FIGURE 1A
FIG. 1A illustrates the current implementation (prior art) of an anti-replay service for IPsec in tunnel mode.

All the figures are schematic, not necessarily to scale, and generally only show parts which are necessary in order to elucidate the invention, wherein other parts may be omitted or merely suggested.

DETAILED DESCRIPTION

Currently, an anti-replay service that is employed in Internet Protocol Security (IPsec), Media Access Control security (MACsec) and Datagram Transport Layer Security (DTLS), among others, comprises a single anti-replay window. The anti-replay window is a logical window. The inventors have realized that this current implementation of anti-replay service makes it difficult to implement the anti-replay algorithm in a scalable way for a single IPsec Security Association (SA) or a DTLS SA. For MACsec, the anti-replay service is known as a replay protection service. The invention herein enables a "scalable" anti-replay service and introduces the concept of multiple instances of anti-replay windows or briefly, sub anti-replay windows. The sub anti-replay windows are introduced while maintaining protection against any anti-replay attacks and providing integrity to the packets or traffic flows. The disclosure of the invention herein reduces the need for compute-intensive tasks such as high-frequency inter-Central Processing Unit (CPU) core synchronization and thus, allows for better performance and improved scalability since more CPU cores may participate in the processing of packets pertaining to a given IPsec SA.

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Generally, all terms used herein are to be interpreted according to their ordinary meaning in the relevant technical field, unless a different meaning is clearly given and/or is implied from the context in which it is used. All references to a/an/the element, feature, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step or feature is explicitly described as following or preceding another step/feature and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

To efficiently balance packet processing between cores of a multi-core CPU, a software can make use of an internal hardware (HW) or a software-based event scheduler that can be used for load balancing such as Data Plane Development Kit's (DPDK) Eventdev. The packet processing is performed in a pipeline which is usually divided into several stages. Each of the several stages in the pipeline have worker threads that perform one or more packet processing functions. An event driven programming model often supports three types of scheduling for "sending" an event from one processing stage to another. In packet switching networks, traffic flow, packet flow or network flow refer to a sequence of packets from a source computer to a destination, which may be another host, a multicast group, or a broadcast domain. The traffic flow, packet flow or the network flow is a sequence of packets that belongs to the same session/connection. A first type of scheduling in packet processing is atomic scheduling. Atomic scheduling guarantees that processing in a particular stage happens in the incoming order of the packets in the same traffic flow. Also, atomic scheduling limits the number of cores used to process one traffic flow to one, for this stage. A second type of scheduling in packet processing is ordered scheduling wherein a traffic flow can be processed on two or more cores simultaneously, while maintaining the incoming order of the packets. A third type of scheduling is parallel scheduling, wherein all cores can process all traffic flows simultaneously, with no preservation of incoming order of packets. For parallel scheduling, at least two CPU cores are preferred.

A separate processing stage is normally required to execute anti-replay service for a single IPsec SA. As disclosed in Internet Engineering Task Force (IETF) Request for Comments (RFC) 4303, IPsec permits a two-stage verification of a Sequence Number (SN) of a packet via the anti-replay service. This is permitted as many cryptographic HW accelerators are not capable of handling decryption and/or authentication in line rate. As disclosed in IETF RFC 8238, line rate or physical-layer frame rate is the maximum capacity to send frames of a specific size at the transmit clock frequency of the Device Under Test (DUT). A first stage of anti-replay service protects the system against "overload" attacks and a second stage is necessary as the information in the IPsec header can't be trusted before it has been authenticated. If the cryptographic HW accelerator can handle the line rate, the first stage of anti-replay service is not necessary.

An IPsec SA is a set of standards and protocols to support secure communication of packets. The IPsec SA ensures that the packets are transported from an IP address across network boundaries and vice-versa. A Media Access Control Security (MACsec) SA is a set of standards and protocols to support secure communication of ethernet frames. The MACsec SA ensures that the frames are securely transported within a Local Area Network (LAN). A DTLS SA is a set of standards and protocols or securing network traffic.

Two primary modes in IPSec are tunnel mode and transport mode. In IPsec tunnel mode, the contents of the original IP packet are encapsulated to become the payload of a new IP packet. Additionally, a new IP header is added on top of the original IP packet. The original IP packet's IP is referred to as the inner IP and the IP of the new IP packet is referred to as the outer IP. Since a new packet is created using the original information, tunnel mode is useful for protecting traffic between different networks. An additional advantage of this mode is that it makes it very easy to establish a "tunnel" between two secure IPsec gateways. In IPsec transport mode, the original IP header is retained. In other words, payload data transmitted within the original IP packet is protected, but not the IP header. In transport mode, encrypted traffic is sent directly between two hosts that previously established a secure IPsec tunnel.

A replay protection service for MACsec behaves in the same manner for frames as anti-replay service in IPsec for IP packets. The corresponding term for anti-replay window in MACSec is replay window. The corresponding term for sequence number of IPsec in MACsec is packet number. For DTLS, the anti-replay service behaves in the same manner as anti-replay service in IPSec. Thus, the invention and all the various embodiments extend to all functions of replay protection for MACsec and DTLS as well.

As mentioned earlier, this disclosure relates to replacing a single anti-replay window with multiple instances or multiple sub anti-replay windows while maintaining protection against anti-replay attacks and providing integrity protection to the data in the packet flows or traffic flows. The anti-replay service of this disclosure is referred to as a scalable anti-replay service interchangeably. For each packet, a hash value based on an integrity-protected packet header and/or payload is computed. The computed hash value is then used to steer a particular packet to a particular sub window. In other words, the computer hash value is used to determine a sub anti-replay window among the sub anti-replay windows. Each sub anti-replay window is based on the computed hash value, which in turn is based completely/exclusively on the data obtained from the particular packet, thus the sub anti-replay window is effectively immutable to a potential attacker. Thus, protection against anti-replay attacks is ensured or at least increased. One of the several advantages of this approach is that multiple sub anti-replay windows will reduce load and store contention which result in a reduction in CPU stalls. In case atomic type scheduling is used for the anti-replay service as described herein, the need for cross-core CPU synchronization is reduced significantly.

Protection against an anti-replay attack for the disclosed scalable anti-replay service will be performed by using the computed hash value as an IPsec SA ID instead of the usual implementation wherein the Security Parameter Index (SPI) from the IPsec header is used as the IPsec SA identifier (ID). As mentioned earlier, the hash value should be constructed in a way that it is only a function of the payload so that the same or replayed packet hits the same sub anti-replay window. In other words, a sub anti-replay window is determined among the sub anti-replay windows based on a hash computation which uses data from the integrity protected part of the first packet and the second packet as sole input to produce a derived sub anti-replay window identifier for each of the first packet and the second packet. The derived sub anti-replay window identifier is the same for each same or replayed packet. In some embodiments, the hash value is generated by applying a hashing function to parts of the payload. Examples of hashing functions include but are not limited to XOR, Cyclic Redundancy Check (CRC), Secure Hashing Algorithm (SHA), and Message Digest (MD). In some embodiments, instead of using a hashing function, the computed hash value could be one or more bits from the payload, wherein the payload is encrypted. In some embodiments, computation of the hash value is performed on a Network Interface Card (NIC).

If a packet order in a flow is important, ordered scheduling must be used for the first anti-replay stage as using anything other than IPsec SA (SPI Index+IP destination) to identify the sub anti-replay window will cause packets in a flow to be out of order. The packet order in a flow is important for backhaul communication. If IPsec is used for fronthaul in the future, the packet order in a flow would not be important and thus, atomic scheduling could be used for the first anti-replay stage. If ordered scheduling is used, the data structures in the sub anti-replay windows must be protected by a "lock". If a field used for identifying the sub anti-replay window is the same as a field used for identifying a flow, atomic scheduling can be used. In the mentioned scenario, a flow ID is equivalent to a sub anti-replay window ID. The sub anti-replay windows' data structures do not have to be protected by a "lock" if atomic scheduling is used. According to an embodiment, the CPU is configured to distribute the first packet and the second packet to different sub anti-replay windows if the sequence number of the first packet and the second packet are different. According to another embodiment, the CPU is configured to distribute the first packet and the second packet to the same sub anti-replay windows if the sequence number of the first packet and the second packet are different.

The number of sub anti-replay windows can be denoted by "$N_{sub}$". $N_{sub}$ should preferably be large enough to provide parallelism but small enough not to use too much memory and/or cause too many cache misses. In some embodiments, $N_{sub}$ is equal to the number of traffic flows to avoid synchronization issues. In an embodiment, the number of sub anti-replay windows is hardcoded/pre-determined by an operator. In another embodiment, the number of sub anti-replay windows is dynamic and determined using a machine learning method.

An extremely uneven distribution of packets to the sub anti-replay windows will cause big jumps in the SN and also temporarily cause a larger window size, if a left edge and a right edge of the sliding window is not updated periodically. A reason for uneven distributions is sub-optimal packet scheduling. To mitigate this potential problem, a mechanism to periodically update/sync the left edge and the right edge of the sub anti-replay windows must be implemented. The window size is not fixed as it is the lowest value of the left edge and the highest value of the right edge in any of the corresponding sub anti-replay windows at any time. The window size will be dynamic until the periodic sync, but it will be fixed just after the periodic sync, i.e., before the first packet arrives. It can for instance be a sequence lock (seqlock)-protected, shared left edge and/or right edge which is/are periodically updated. In other words, the window size is not only on a per-packet basis. If various embodiments of the method described herein are introduced into a pipeline which already performs load balancing based on packet contents, further gains can be made, in that no "extra" processing stage needs to be added, and that inter-core anti-replay window synchronization would no longer be needed.

Figure 1B:
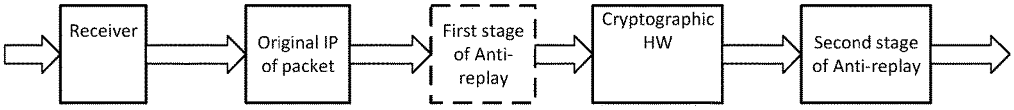
(Prior Art) FIGURE 1B
FIG. 1B illustrates the current implementation (prior art) of an anti-replay service for IPsec in transport mode.
Figure 2:
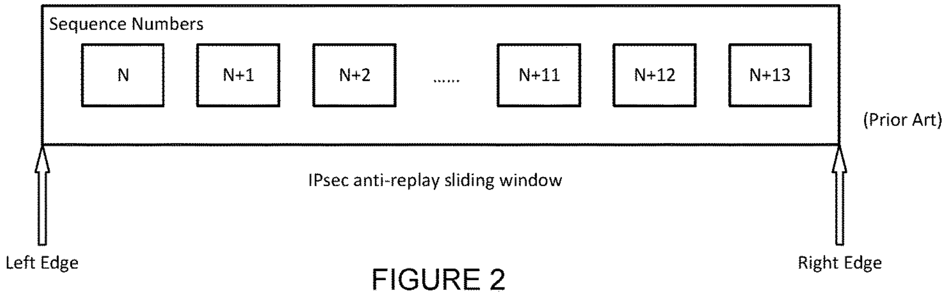
(Prior Art) FIGURE 2
FIG. 2 illustrates a sliding window (prior art) for an IPsec anti-replay service.

Current implementations and a sliding window for IPSec, i.e. prior art for the invention, are illustrated with the help of FIGS. 1A, 1B and 2 to more readily disclose how the invention differs from the prior art. FIG. 1A illustrates the current implementation of an anti-replay service for IPsec in tunnel mode. A receiver comprising a CPU is configured to receive incoming packets either before or after decryption from a single IPsec SA. The receiver also comprises a cryptographic HW accelerator. The CPU is further configured to process the incoming packets to read the outer IP of the packets. The CPU is further configured to process the packets, wherein the rest of the contents of the packets are enqueued except the inner IP for a first stage of anti-replay service. The first stage of anti-replay service is implemented since many cryptographic HW accelerators are not capable of handling the decryption and/or authentication at the line rate. The first stage effectively protects the system comprising the CPU and the HW accelerator against overload attacks. The HW accelerator is configured to perform computationally intensive cryptographic operations on the contents of the packets. The HW accelerator is further configured to enqueue the contents of the packets before passing on the contents to a second stage of anti-replay service. The second stage of anti-replay service is necessary as the information in the IPsec header cannot be trusted before it has been authenticated. If the HW accelerator can handle line rate, the first stage of anti-replay service is not required. After the second stage of the anti-replay service, the CPU is configured to send the process the contents of the packets and enqueue them before reading the inner IP of the packets.

FIG. 1B illustrates the current implementation of an anti-replay service for IPsec in transport mode. A receiver comprising a CPU is configured to receive incoming packets before or after decryption from a single IPsec SA. The receiver also comprises a cryptographic HW accelerator. The CPU is further configured to process the incoming packets to read the original IP of the packets. The CPU is further configured to process the packets, wherein the rest of the contents of the packets are enqueued except the inner IP for a first stage of anti-replay service. The HW accelerator is configured to perform computationally intensive cryptographic operations on the contents of the packets. The HW accelerator is further configured to enqueue the contents of the packets before passing on the contents to a second stage of anti-replay service.

FIG. 2 illustrates a sliding window for an IPsec anti-replay service. The sliding window comprises a left edge and a right edge. Considering that the sliding window duration is N to N+13. The sliding window can for example accept 14 packets at a time, that is, the window size of the sliding window is 14. In this case, the lowest sequence number, N, is the left edge and the highest sequence number, N+13, is the right edge.

Figure 3A:
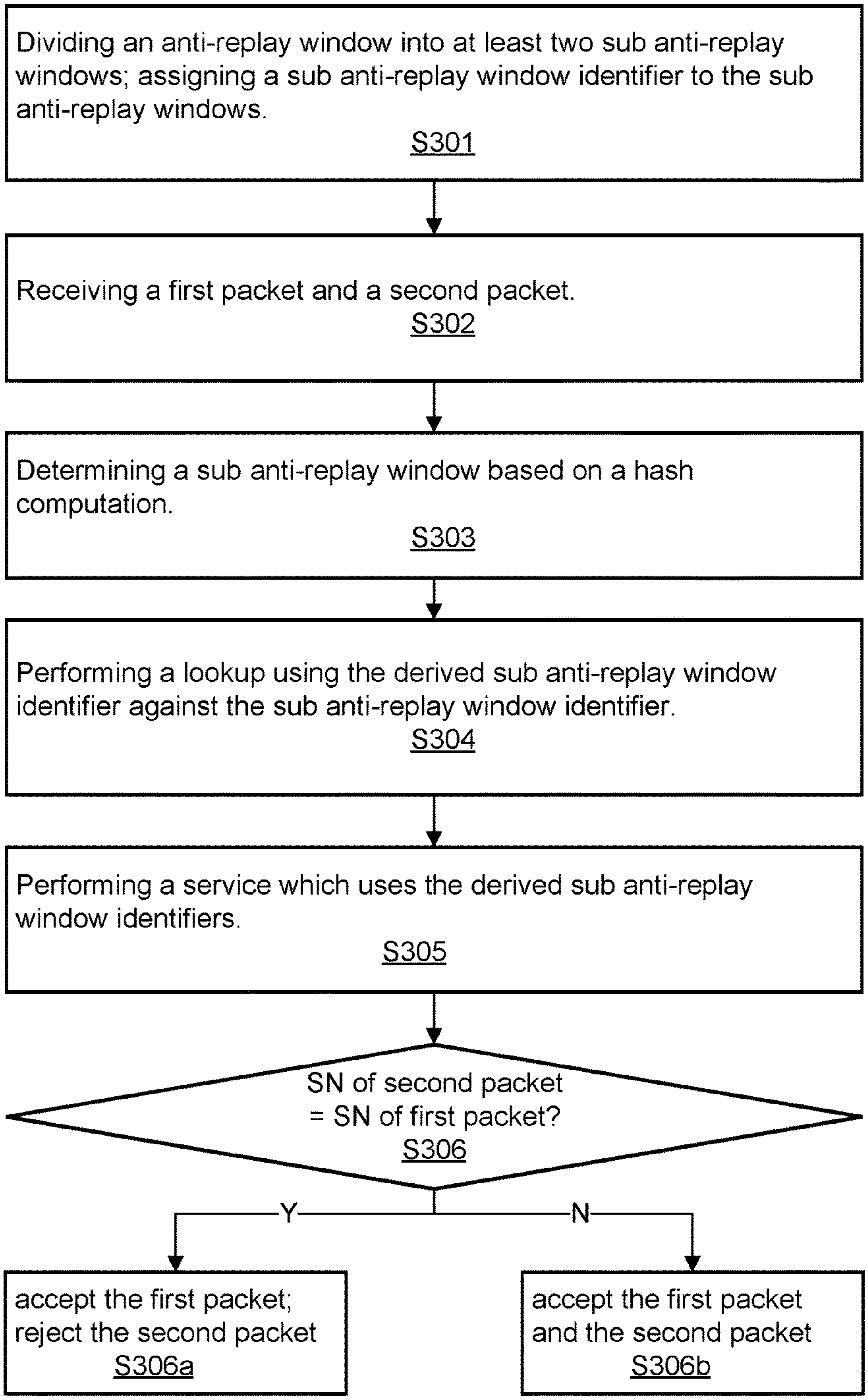
FIG. 3A is a flowchart depicting embodiments of a method in a multi-core CPU, in accordance with an embodiment of the invention.
Figure 4:
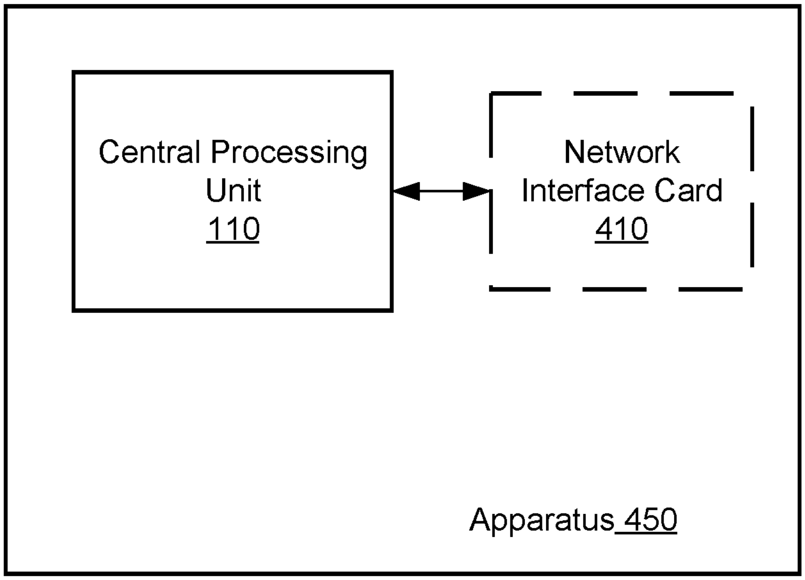
FIG. 4 illustrates a schematic block diagram of a CPU placed inside an apparatus, in accordance with an embodiment of the invention.
Figure 5:
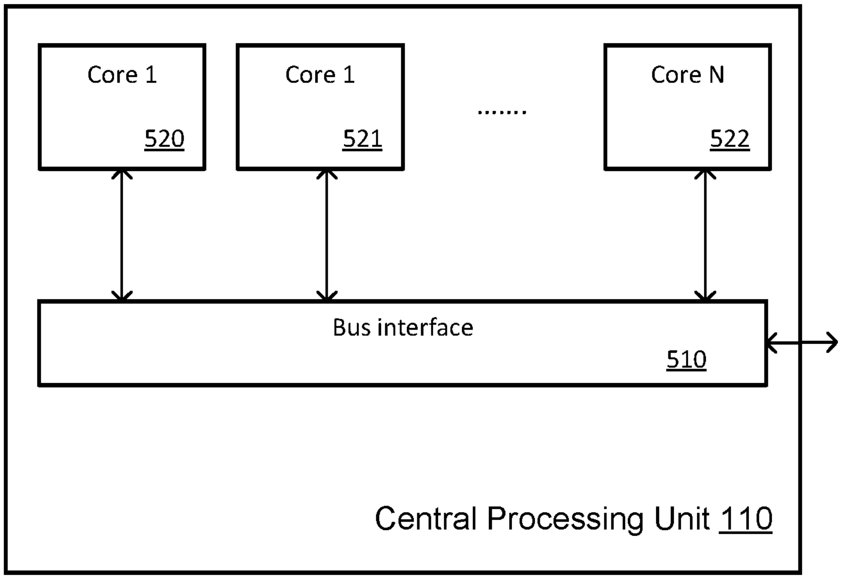
FIG. 5 illustrates a schematic block diagram of a CPU, in accordance with an embodiment of the invention.
Figure 8:
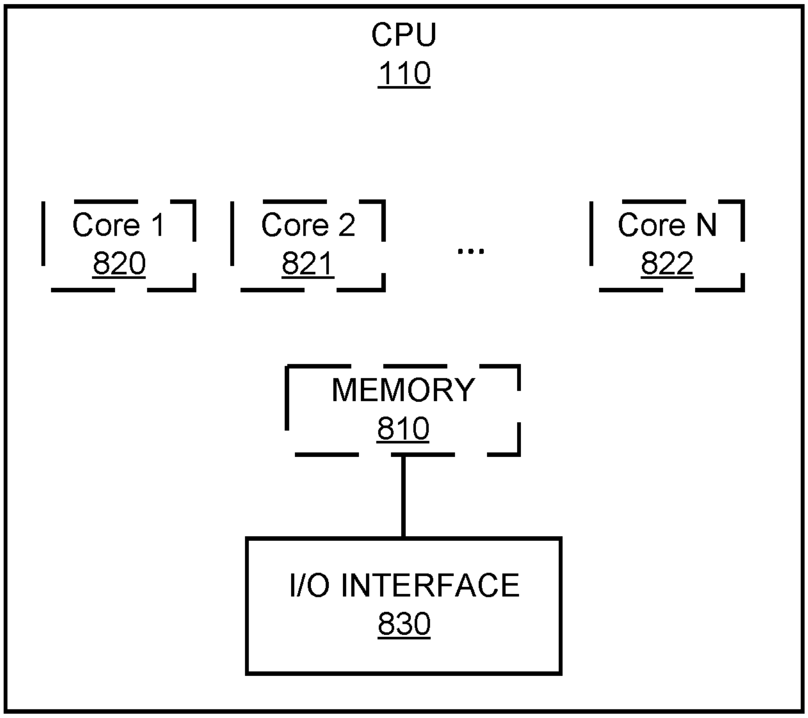
FIG. 8 illustrates a CPU, in accordance with an embodiment of the invention.

FIG. 3A is a flowchart depicting embodiments of a method in a multi-core CPU 110 (shown in FIGS. 4, 5 and 8). In S301, the CPU 110 divides an anti-replay window for the SA into at least two sub anti-replay windows wherein each of the sub anti-replay windows is assigned a sub anti-replay window identifier. In S302, the CPU 110 receives a first packet and a second packet wherein each of the first packet and the second packet comprise an integrity protected part. In S303, the CPU 110 for each of the first packet and the second packet, determines a sub anti-replay window among the sub anti-replay windows based on a hash computation. In other words, the CPU 110 for each of the first packet and the second packet, steers the first packet and the second packet to a sub anti-replay window among the sub anti-replay windows based on a hash computation. The determined hash computation from the CPU uses data from the integrity protected part of the first packet and the second packet as sole input to produce a derived sub anti-replay window identifier for each of the first packet and the second packet. In S304, the CPU 110 performs a lookup for the sub anti-replay window using the derived sub anti-replay window identifier for each of the first packet and the second packet against the sub anti-replay window identifier of each of the sub anti-replay windows. In other words, the CPU 110 performs a lookup in an index, a table, a memory unit or a CPU register for the sub anti-replay window using the derived sub anti-replay window identifier for each of the first packet and the second packet against the sub anti-replay window identifier of each of the sub anti-replay windows. In S305, the CPU 110 further performs a service, wherein the service uses the derived sub anti-replay window identifiers for each of the first packet and the second packet. In S306, the CPU 110 checks if an SN for the second packet and the first packet for the particular SA is the same. If the SN for the first packet and the second are same, in S306*a*, the CPU 110 processes the first packet and rejects the second packet. If the SN for the first packet and the second packet are different, in S306*b*, the CPU 110 processes the first packet and the second packet, i.e. accept both the first packet and the second packet.

Figure 3B:
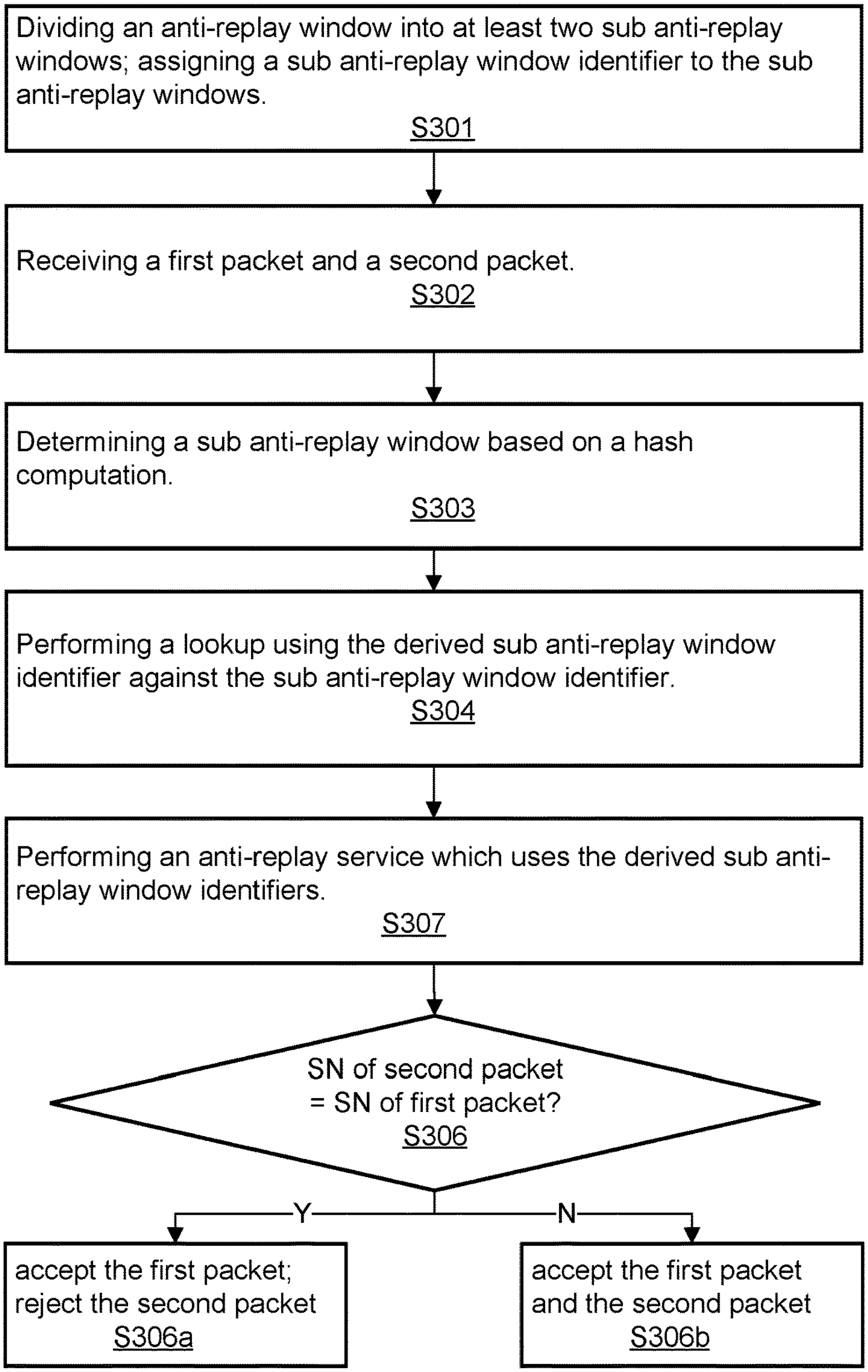
FIG. 3B is a flowchart depicting embodiments of a method in a multi-core CPU, in accordance with an embodiment of the invention.

FIG. 3B is a flowchart depicting embodiments of a method in the multi-core CPU 110. The method includes the steps S301, S302, S303, S304, S306, S306*a* and S306*b* as disclosed for FIG. 3A. However, instead of or in addition of performing S305, the CPU 110 performs in S307 an anti-replay service or a replay protection service, wherein the service uses the derived sub anti-replay window identifiers for each of the first packet and the second packet.

FIG. 4 illustrates a schematic block diagram of the CPU 110 placed inside an apparatus 450 according to one or more embodiments. The apparatus 450 may be any of but not restricted to an electronic device, a telecommunications system node, and a networking node. The apparatus here also comprises an (optional) NIC 410. The NIC 410 may be connected to the CPU via means such as a Peripheral Component Interconnect Express (PCIe) or any other connector.

FIG. 5 illustrates a schematic block diagram of a CPU 110 according to still other embodiments. As shown, the CPU 110 implements various functional means, units, or modules, e.g., via the bus interface 510, core 1 520, core 2 521, core N 522, etc. and/or via software code. These functional means, units, or modules, e.g., for implementing the method(s) herein, can for example include, cores for enabling the anti-replay service according to the embodiment disclosed in conjunction with FIG. 3B. The number of cores may be any number greater than or equal to 2.

FIG. 6 illustrates a tabular format of an example for anti-replay service on an IPsec SA with an ESP header, an anti-replay window size=4 and two sub anti-replay windows (and thus a one-bit sub anti-replay window ID, that is a sub anti-replay window ID={0, 1}). For each incoming packet, a verdict is issued as an output. The verdict, which alternatively could be called a decision, acceptance, or result, indicates whether the packet will be accepted or dropped by the CPU 110. Let us consider, as an example, that initial window left edge=0 and window right edge=3, thus the window range or the window is from 0-3. If the first incoming packet has an ESP SN=2 and a payload-based sub anti-replay window ID=0, then the CPU 110 provides a verdict of 'accept', that is, the CPU 110 accepts the incoming packet. Considering that the left edge of the sub anti-replay window updates periodically or after a certain amount of time has passed, the new left edge=1. The periodicity of updating the left edge of both sub anti-replay windows is based on a timer. Furthermore, if the second incoming packet has ESP SN=4 and a payload-based sub anti-replay window ID=0, then the CPU 110 provides a verdict of 'accept', that is, the CPU 110 accepts the incoming packet. The right edge of the sub anti-replay window consequently updates to 4 since the right edge is updated each time the SN is higher than the current right edge. So, the new sub anti-replay window range is from 1 to 4. The timer for updating the edges can be configured on a per packet basis or any other fixed time, for e.g., 1 ms. Further, if the third incoming packet has ESP SN=3 and a payload-based sub anti-replay window ID=1, then the CPU provides a verdict of 'accept', that is, the CPU 110 accepts the incoming packet. Even further, if the fourth incoming packet has ESP SN=3 and a payload-based sub anti-replay window ID=1, then the CPU 110 provides a verdict of 'drop', that is, the CPU 110 rejects the incoming packet. Even further, if the fourth incoming packet has ESP SN=0 and a payload-based sub anti-replay window ID=0, then the CPU 110 provides a verdict of 'drop', that is, the CPU 110 rejects the incoming packet. The basis of 'accept' and 'drop' in the CPU 110 thus is based on several factors such as the ESP SN, sub anti-replay window ID and payload-based sub anti-replay window ID.

Figure 7A:
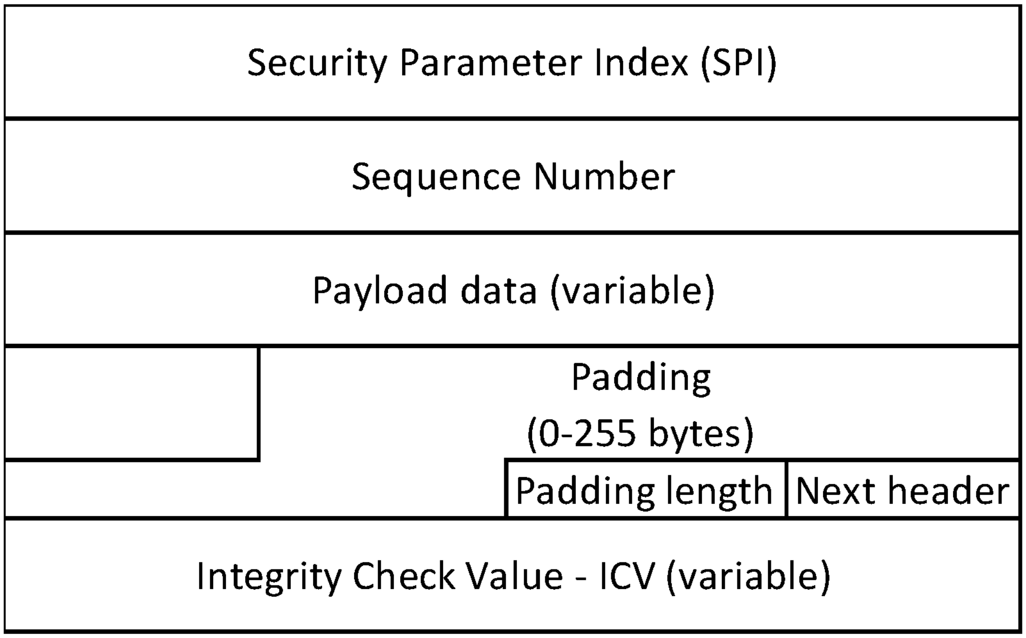
FIGURE 7A (Prior Art)
FIG. 7A illustrates an ESP packet format.

FIG. 7A illustrates an ESP packet format. The ESP packet comprises a Security Parameter Index (SPI), SN, variable payload data, 0-255 padding bytes, a padding length, a next header (typically an identification of the type of the next header), and a variable Integrity Check Value (ICV). The entirety of the contents of the ESP packet are integrity protected. This integrity protected part of the ESP packet is used for hash computation in the disclosure herein. The outer IP of the packet is not used for hash computation.

Figure 7B:
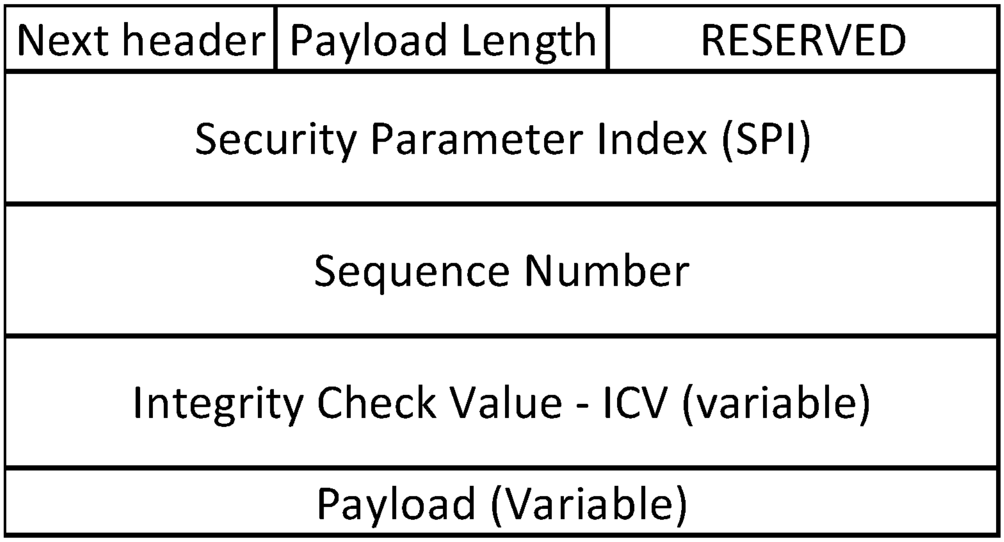
FIGURE 7B (Prior Art)
FIG. 7B illustrates an AH packet format.

FIG. 7B illustrates an AH packet format. The AH packet comprises an SPI, SN, payload length, a next header, reserved bits, a variable Integrity Check Value (ICV) and a variable payload. All fields of the AH packet are integrity protected except for the variable payload. This integrity protected part of the ESP packet is used for hash computation in the disclosure herein.

FIG. 8 illustrates an example of the CPU 110 as implemented in accordance with one or more embodiments. The CPU 110 is adapted/configured/operable to perform a set of operations, or steps, S301, S302, S303, S304, S305, S306, S306*a*, S306*b*, S307 as disclosed above, e.g., by executing instructions stored in a memory 810. The CPU 110 here comprises multiple cores: core 1 820, core 2 821 to core N 822. The CPU 110 in this regard may implement certain functional means, units, or modules. The memory 810 may be or include one or more non-volatile storage medium and/or one or more volatile storage medium. In an embodiment, a computer program product 910 may be provided in the CPU 110. Such computer program product is described in relation to FIG. 9.

The memory 810 may store any suitable instructions, data, or information, including software, an application including one or more of logic, rules, code, tables, and/or other instructions/computer program code capable of being executed by the CPU 110. The memory 810 may further be used to store any calculations made by the CPU 110 and/or any data received via an Input/Output (I/O) interface circuitry 830, such as input from CPU 110. In some embodiments, the CPU 110 and memory 810 are integrated. The I/O Interface circuitry 830 is configured to transmit and/or receive information to and/or from one or more other electronic apparatus, e.g., via input cable lines.

Figure 9:
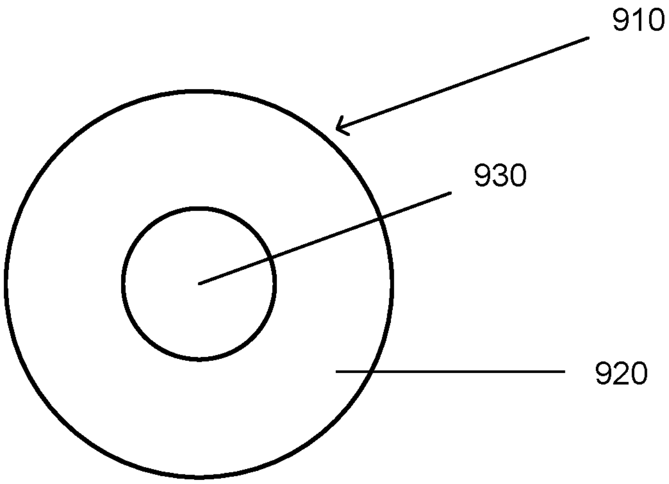
FIG. 9 shows one example of a computer program product, in accordance with an embodiment of the invention.

FIG. 9 shows one example of a computer program product 910, which in an embodiment, is in the CPU 110. A computer readable storage medium 920 of the computer program product 910, is a non-transitory computer readable medium, such as, a magnetic medium (e.g., a hard disk), optical medium, and a memory devices (e.g. flash memory). The computer readable storage medium 920 stores a computer program 930 comprising computer readable instructions. In some embodiments, the computer readable instructions of the computer program 930 are configured such that when executed by the CPU 110, the computer readable instructions cause the CPU 110 to perform steps described herein (e.g., S301, S302, S303, S304, S305, S306, S306*a*, S306*b*, S307). In other embodiments, the CPU 110 may be configured/operable to perform steps described herein without the need for code. That is, for example, CPU 110 may consist merely of one or more ASICs. Hence, the features of the embodiments described herein may be implemented in hardware and/or software. In other words, the computer program product 910 comprises a computer readable storage medium 920 on which the computer program 920 is stored, where the computer program 920 causes the CPU 110 to execute any or all of the various embodiments herein.

The computer program 920 mentioned above may also be provided, for instance in the form of a data carrier carrying computer program 920 for performing the embodiments herein when being loaded into a hardware. One such carrier may be in the form of a CD ROM disc. It is however feasible with other data carriers such as a memory stick. The computer program 920 may furthermore be provided as pure program code on a server and downloaded to the hardware device at production, and/or during software updates.

Figure 10:
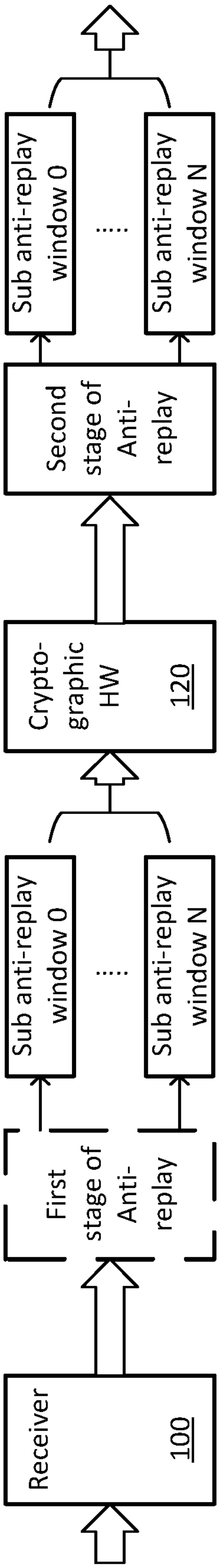
FIG. 10 illustrates a schematic block diagram of an anti-replay service, in accordance with an embodiment of the invention.

FIG. 10 illustrates a schematic block diagram of a scalable anti-replay service according to an embodiment of the invention. A receiver 100 comprising CPU 110 is configured/adapted to receive incoming packets from an IPsec SA. The receiver 100 also comprises an optional cryptographic HW accelerator 120. The packets are sent to an optional first stage of anti-replay. The packets are then distributed into different sub anti-replay windows based on a derived sub anti-replay window identifier. A sub anti-replay window is chosen or determined among the sub anti-replay windows based on a computed hash value which uses data from the integrity protected part of the packets as sole input to produce a derived sub anti-replay window identifier. The output from the sub anti-replay windows 0 . . . N are sent to a cryptographic hardware to perform cryptographic operations. The output of the cryptographic hardware 120 is sent to a second stage of anti-replay, wherein the incoming data is distributed into sub anti-replay windows 0 . . . N and either accepted or dropped based on SN of the packets.

Figure 11:
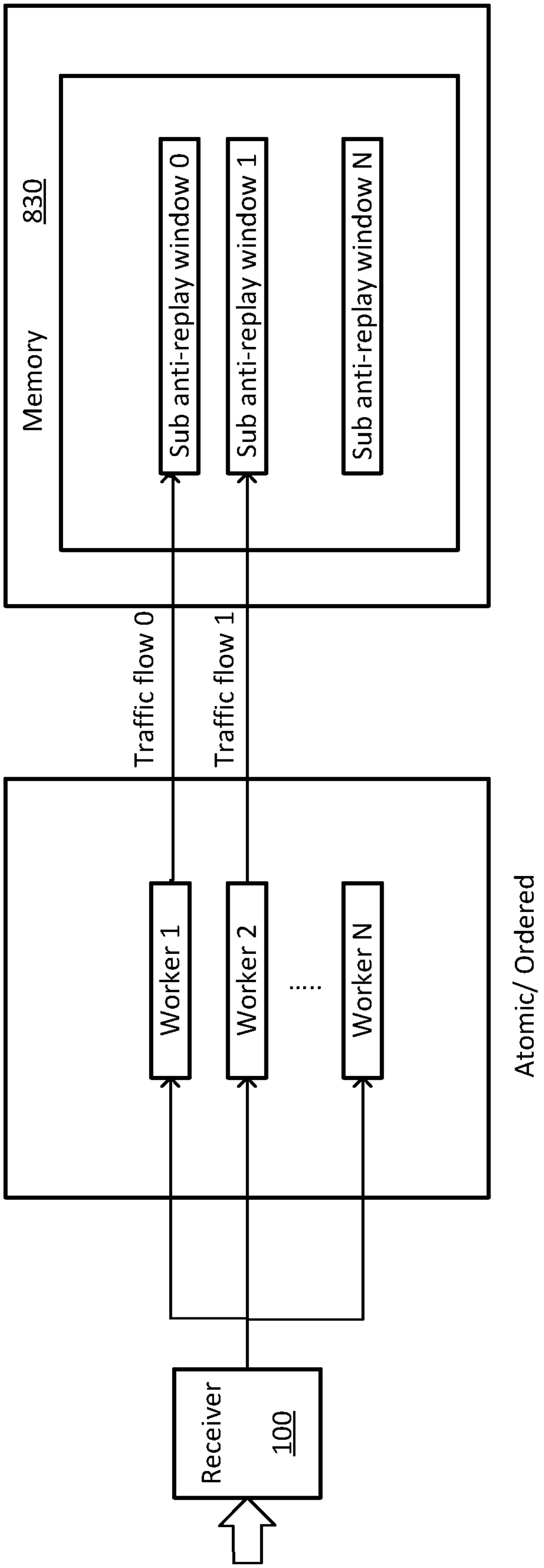
FIG. 11 illustrates a schematic block diagram of an anti-replay service in a system comprising a receiver using atomic/ordered scheduling, in accordance with an embodiment of the invention.

FIG. 11 illustrates a schematic block diagram of an anti-replay service in a system comprising a receiver 100 using either atomic or ordered scheduling. The receiver 100 is configured to perform load balancing functionality which helps in distributing incoming packets to worker threads. As mentioned earlier, the receiver 100 comprises a CPU 110 and may or may not comprise a crypto HW accelerator 120. The CPU 110 is a multi-core CPU. Also, the CPU 110 may comprise one or several worker threads and a memory unit 810. The receiver 100 is configured to receive incoming packets and then distribute the packets to worker threads 1 . . . N of the anti-replay service as part of the load balancing functionality. In an embodiment, the anti-replay service is executed in either an atomic or an ordered stage, thus the worker threads 1 . . . N are configured to perform the anti-replay service in an atomic or ordered scheduling manner. Several worker threads can handle packets from the same IPsec SA at a time, thus increasing the parallelism in case of the multi-core CPU 110. The CPU 110 is then further configured to receive output from the atomic or ordered stage of anti-replay service in the form of traffic flows. In the anti-replay service as per the invention, there are at least two sub anti-replay windows per SA. Each of the traffic flows will be distributed to sub anti-replay windows 0 . . . N based on a load balancer placed either inside or outside the receiver 100. Hence, the CPU 110 having multiple cores, may make use of the full potential of the multiple cores or at least improve the scalability and/or efficiency of the receiver 100. In an embodiment, the CPU 110 is configured to operate each sub anti-replay window on a separate core, thus improving the scalability of the anti-replay service. The CPU 110 is further configured to perform the anti-replay service wherein the incoming packets are either accepted or rejected based on their SN. In an embodiment, the CPU 110 is configured to perform the anti-replay service based on a sliding window size and/or a right or left edge of a window.

The CPU 110 comprising multiple cores, wherein the CPU is configured to divide an anti-replay window for the SA into at least two sub anti-replay windows wherein each of the sub anti-replay windows is assigned a sub anti-replay window identifier; receive a first packet and a second packet, each of the first packet and the second packet comprising an integrity protected part; for each of the first packet and the second packet, determine a sub anti-replay window among the sub anti-replay windows based on a hash computation which uses data from the integrity protected part of the first packet and the second packet as sole input to produce a derived sub anti-replay window identifier for each of the first packet and the second packet; perform a lookup for the sub anti-replay window using the derived sub anti-replay window identifier for each of the first packet and the second packet against the sub anti-replay window identifier of each of the sub anti-replay windows; perform a service, wherein the service uses the derived sub anti-replay window identifiers for each of the first packet and the second packet to accept the first packet and reject the second packet if sequence number of the second packet and the first packet are the same and accept the first packet and the second packet if sequence number of the first packet and the second packet are different. In an embodiment, wherein the service is an anti-replay service.

In an embodiment, the CPU 110 is configured to receive the first packet and the second packet, one each at two of the multiple cores. In an embodiment, the CPU 110 is configured to receive the first packet and the second packet at one of the multiple cores. In an embodiment, the number of sub anti-replay windows is less than or equal to 2^[length of data (in bits)]. In an embodiment, the CPU is configured to configured to distribute the first packet and the second packet to the same sub anti-replay window if the sequence number of the first packet and the sequence number of the second packet are same. In an embodiment, the CPU 110 is configured to receive a third packet and distributing the third packet to the same sub anti-replay window as the first packet if sequence number of the third packet is same as the sequence number of the first packet. In an embodiment, the CPU 110 is configured to receive a third packet and distributing the third packet to the same sub anti-replay window as the second packet if sequence number of the third packet is same as the sequence number of the second packet. In an embodiment, the CPU 110 is configured to distribute the first packet and the second packet to different sub anti-replay windows if the sequence number of the first packet and the second packet are different. In an embodiment, the CPU 110 is configured to reject and/or discard the second packet if the sequence number of the first packet is greater than or equal to the sequence number of the second packet or wherein the CPU is configured to reject and/or discard the second packet if the sequence number of the first packet is lesser than or equal to the sequence number of the second packet. In an embodiment, the anti-replay service on the first packet and the second packet is performed using other bytes in the first packet and the second packet than the respective Security Parameters Index, SPI, value. In an embodiment, the first packet and the second packet belong to a first traffic flow and a second traffic flow. In an embodiment, the CPU 110 is configured to schedule the first traffic flow and the second traffic flow one each at two of the multiple cores using atomic scheduling wherein if the data selected for traffic flow identification is the same as the data selected for determining the sub anti-replay window, no synchronization is required when updating the sub anti-replay window. In an embodiment, the CPU 110 is configured to schedule the first traffic flow and the second traffic flow one each at two of the multiple cores using ordered scheduling wherein the CPU 110 is configured to determine contention risk in the service based on the number of sub anti-replay windows. In an embodiment, the sub anti-replay window comprises a right edge and a left edge wherein the right edge and left edge are periodically synced. In an embodiment, the CPU 110 is configured to process the sub anti-replay windows on a per core basis. In an embodiment, the CPU 110 is configured to perform the service on the first packet and the second packet in parallel. In an embodiment, the hash computation for each of the first and the second packet always results in the same derived sub anti-replay window identifier for each of the first packet and the second packet. In an embodiment, the CPU 110 is configured to delegate or offload at least a part of the hash computation to a Network Interface Card, NIC 410. In an embodiment, the integrity protected part of the first packet and the second packet are the Encapsulation Security Payload, ESP, header, payload data and ESP trailer in each of the first packet and the second packet. In an embodiment, the data from the integrity protected part of each of the first packet and the second packet is encrypted. In an embodiment, the hash computation for each of the first packet and the second packet comprises extracting an encrypted bit of each of the first packet and the second packet. In another embodiment, the data from the integrity protected part of each the first packet and the second packet is unencrypted. In an embodiment, the SA is an IPSec SA or a MACSec SA or a DTLS SA.

Most cloud environments use standard uniform server platforms working in parallel to provide flexibility and/or scalability. Adding HW accelerators to one or more server platforms is difficult as it jeopardizes uniformity provided by the server platforms. Thus, it is important to use better SW implementations running on general purpose processors for tasks that are normally offloaded to HW accelerators. The disclosure herein makes it possible to implement a scalable IPsec Gateway (GW) in a cloud-native manner. In other words, the disclosure herein enables implementing a scalable service such as an anti-replay service or replay protection service on a general-purpose CPU which can be used in current and future cloud environments.

The person skilled in the art realizes that the invention by no means is limited to the embodiments described above. On the contrary, many modifications and variations are possible within the scope of the appended claims. Examples of the receiver 100 are a base station, a UE, a computer, a router, a switch or any other device capable of networking. Examples of base station include, but are not limited to, Node Bs, evolved Node Bs (eNBs), NR nodeBs (gNBs), radio access points (APs), relay nodes, remote radio head (RRH), a node in a distributed antenna system (DAS), etc. Also, the CPU 110 may be used in any 3GPP standard such as 3G, 4G, 5G, 6G and beyond or non-3GPP standard such as Low Power, Wide Area networking (LoRaWAN), Sigfox, Wireless Local Area Network (WLAN) and beyond. The CPU 110 as described in the various embodiments herein improves the scalability of anti-replay functions in any SA based protocol such as IPsec, MACsec and DTLS.

Those skilled in the art will also appreciate that the blocks in the representation of the CPU 110 in FIG. 8 may refer to a combination of analog and digital circuits, configured with software and/or firmware, e.g. stored in one or more local storage units, that when executed by the CPU 110 perform steps S301, S302, S303, S304, S305, S306, S306*a*, S306*b*, S307 as described above. The CPU 110 as described by the invention, as well as any other combination of analog and digital circuits, may be included in a single application-specific integrated circuitry (ASIC), or several controllers and various digital hardware may be distributed among several separate components, whether individually packaged or assembled into a system-on-a-chip (SoC).

The invention claimed is:

1. A method associated with a Security Association (SA) performed by a Central Processing Unit (CPU) comprising multiple cores, the method comprising:

replacing an anti-replay window for the SA with multiple sub anti-replay windows;

receiving a first packet and a second packet, each of the first packet and the second packet comprising an integrity protected part;

computing a hash value, based on the integrity protected part for each of the first packet and the second packet, respectively, to produce a derived sub anti-replay window identifier for each of the first packet and the second packet;

performing a lookup for a respective sub anti-replay window, using the derived sub anti-replay window identifier, for each of the first packet and the second packet against sub anti-replay window identifier of each of the multiple sub anti-replay windows;

distributing each of the first packet and the second packet, using the derived sub anti-replay window identifier, to a sub anti-replay window of the multiple sub anti-replay windows; and performing an anti-replay service, wherein the anti-replay service uses the derived sub anti-replay window identifier of the first packet and the second packet to compare respective sequence numbers and to:

accept the first packet and reject the second packet if a sequence number of the first packet and a sequence number of the second packet are same; and accept the first packet and the second packet if a sequence number of the first packet and a sequence number of the second packet are different.

2. The method of claim 1 comprising receiving the first packet and the second packet, one each at two of the multiple cores.

3. The method of claim 1 comprising receiving the first packet and the second packet at one of the multiple cores.

4. The method of claim 1, wherein a number of sub anti-replay windows is less than or equal to 2^(length of data bits).

5. The method of claim 1 comprising distributing, using the derived sub anti-replay window identifier, the first packet and the second packet to a same sub anti-replay window if the sequence number of the first packet and the sequence number of the second packet are equal.

6. The method of claim 1 comprising receiving a third packet comprising an integrity protected part, and distributing, using the derived sub anti-replay window identifier, the third packet to a same sub anti-replay window as the first packet if sequence number of the third packet is same as the sequence number of the first packet.

7. The method of claim 1 comprising receiving a third packet comprising an integrity protected part and distributing, using the derived sub anti-replay window identifier, the third packet to a same sub anti-replay window as the second packet if sequence number of the third packet is same as the sequence number of the second packet.

8. The method of claim 1 comprising distributing, using the derived sub anti-replay window identifier, the first packet and the second packet to different sub anti-replay windows if the sequence number of the first packet and the second packet are different.

9. The method of claim 1 comprising:

discarding the second packet if the sequence number of the first packet is greater than or equal to the sequence number of the second packet; or discarding the second packet if the sequence number of the first packet is lesser than or equal to the sequence number of the second packet.

10. A Central Processing Unit (CPU) comprising multiple cores, the CPU configured to:

replace an anti-replay window for a Security Association (SA) with multiple sub anti-replay windows;

receive a first packet and a second packet, each of the first packet and the second packet comprising an integrity protected part;

compute a hash value, based on the integrity protected part for each of the first packet and the second packet, respectively, to produce a derived sub anti-replay window identifier for each of the first packet and the second packet;

perform a lookup for a respective sub anti-replay window, using the derived sub anti-replay window identifier, for each of the first packet and the second packet against sub anti-replay window identifier of each of the multiple sub anti-replay windows;

distribute each of the first packet and the second packet, using the derived sub anti-replay window identifier, to a sub anti-replay window of the multiple sub anti-replay windows; and perform an anti-replay service, wherein the anti-replay service uses the derived sub anti-replay window identifier of the first packet and the second packet to compare respective sequence numbers and to:

accept the first packet and reject the second packet if a sequence number of the first packet and a sequence number of the second packet are same; and accept the first packet and the second packet if a sequence number of the first packet and a sequence number of the second packet are different.

11. The CPU of claim 10 further to receive the first packet and the second packet, one each at two of the multiple cores.

12. The CPU of claim 10 further to receive the first packet and the second packet at one of the multiple cores.

13. The CPU of claim 10, wherein a number of sub anti-replay windows is less than or equal to 2^(length of data bits).

14. The CPU of claim 10 further to distribute, using the derived sub anti-replay window identifier, the first packet and the second packet to a same sub anti-replay window if the sequence number of the first packet and the sequence number of the second packet are same.

15. The CPU of claim 10 further to receive a third packet comprising an integrity protected part and distributing, using the derived sub anti-replay window identifier, the third packet to a same sub anti-replay window as the first packet if sequence number of the third packet is same as the sequence number of the first packet.

16. The CPU of claim 10 further to receive a third packet comprising an integrity protected part and distributing, using the derived sub anti-replay window identifier, the third packet to a same sub anti-replay window as the second packet if sequence number of the third packet is same as the sequence number of the second packet.

17. The CPU of claim 10 further to distribute, using the derived sub anti-replay window identifier, the first packet and the second packet to different sub anti-replay windows if the sequence number of the first packet and the second packet are different.

18. A non-transitory computer readable storage medium having thereon a computer program comprising instructions which, when executed on a Central Processing Unit (CPU) with multiple cores, perform operations comprising:

replacing an anti-replay window for a Security Association (SA) with multiple sub anti-replay windows;

receiving a first packet and a second packet, each of the first packet and the second packet comprising an integrity protected part;

computing a hash value, based on the integrity protected part for each of the first packet and the second packet, respectively, to produce a derived sub anti-replay window identifier for each of the first packet and the second packet;

performing a lookup for a respective sub anti-replay window, using the derived sub anti-replay window identifier, for each of the first packet and the second packet against sub anti-replay window identifier of each of the multiple sub anti-replay windows;

distributing each of the first packet and the second packet, using the derived sub anti-replay window identifier, to a sub anti-replay window of the multiple sub anti-replay windows; and performing an anti-replay service, wherein the anti-replay service uses the derived sub anti-replay window identifier of the first packet and the second packet to compare respective sequence numbers and to:

accept the first packet and reject the second packet if a sequence number of the first packet and a sequence number of the second packet are same; and accept the first packet and the second packet if a sequence number of the first packet and a sequence number of the second packet are different.

* * * * *